(12) United States Patent
Chiu et al.

(10) Patent No.: US 9,047,894 B2
(45) Date of Patent: Jun. 2, 2015

(54) MAGNETIC WRITE HEAD HAVING SPIN TORQUE OSCILLATOR THAT IS SELF ALIGNED WITH WRITE POLE

(71) Applicant: HGST Netherlands B.V., Amsterdam (NL)

(72) Inventors: Andrew Chiu, San Jose, CA (US); Edward H. P. Lee, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/045,662

(22) Filed: Oct. 3, 2013

(65) Prior Publication Data

US 2015/0098150 A1    Apr. 9, 2015

(51) Int. Cl.
G11B 5/48 (2006.01)
G11B 5/31 (2006.01)

(52) U.S. Cl.
CPC ............ *G11B 5/4826* (2013.01); *G11B 5/3163* (2013.01)

(58) Field of Classification Search
USPC ....................................................... 360/125.3
See application file for complete search history.

(56) References Cited

U.S. PATENT DOCUMENTS

| | | | |
|---|---|---|---|
| 7,724,469 B2 | 5/2010 | Gao et al. | |
| 7,764,136 B2 | 7/2010 | Suzuki et al. | |
| 7,982,996 B2 * | 7/2011 | Smith et al. | 360/59 |
| 8,238,058 B2 | 8/2012 | Shimizu et al. | |
| 8,274,811 B2 | 9/2012 | Zhang et al. | |
| 8,305,711 B2 | 11/2012 | Li et al. | |
| 8,456,967 B1 * | 6/2013 | Mallary | 369/13.33 |
| 8,477,453 B2 * | 7/2013 | Takano et al. | 360/125.14 |
| 8,547,661 B2 * | 10/2013 | Bai | 360/125.3 |
| 8,553,362 B2 * | 10/2013 | Tanabe et al. | 360/125.3 |
| 8,625,235 B2 * | 1/2014 | Takano et al. | 360/125.15 |
| 2011/0090603 A1 | 4/2011 | Bai | |
| 2011/0273800 A1 | 11/2011 | Takano et al. | |
| 2012/0147502 A1 | 6/2012 | Udo et al. | |
| 2012/0242416 A1 | 9/2012 | Katti | |

OTHER PUBLICATIONS

Zhu et al., "Microwave Assisted Magnetic Recording Utilizing Perpendicular Spin Torque Oscillator With Switchable Perpendicular Electrodes," 2010 IEEE, IEEE Transactions on Magnetics, vol. 46, No. 3, Mar. 2010, pp. 751-757.

* cited by examiner

*Primary Examiner* — Wayne Young
*Assistant Examiner* — Mark Blouin
(74) *Attorney, Agent, or Firm* — Zilka-Kotab, PC

(57) ABSTRACT

A magnetic write head having a write pole with a tapered trailing edge portion and having a spin torque oscillator that is formed entirely on the tapered trailing edge portion and that is self aligned with first and second sides of the write pole. The write pole and spin torque oscillator are formed by a method wherein the sides of the spin torque oscillator and write pole are defined in the same photolithographic and ion milling process, thereby allowing for the self alignment of the spin torque oscillator with the sides of the write pole.

8 Claims, 39 Drawing Sheets

MAGNETIC WRITE HEAD HAVING SPIN TORQUE OSCILLATOR THAT IS SELF ALIGNED WITH WRITE POLE

FIELD OF THE INVENTION

The present invention relates to magnetic data recording and more particularly to a magnetic write head having a write element with a spin torque oscillator having sides that are self aligned with a main magnetic write pole of the write element.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air hearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor or a Tunnel Junction Magnetoresivive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the adjacent magnetic media.

As data density requirements increase it becomes necessary to decrease the size of magnetic bits recorded on a magnetic media and also the spacing between bits. This requires reducing the size of the write pole. However, as the size of the write pole shrinks, it becomes ever more difficult to achieve sufficient write field density to record a stable magnetic bit. In addition the coercivity of the recording media must increase in order for the recorded data to remain stable. This requires even higher write field density. Therefore, there remains a need for a write head structure that can record a stable magnetic recording to a media at very high data density.

SUMMARY OF THE INVENTION

The present invention provides a magnetic write head that includes a magnetic write pole having a first and second sides and a trailing edge extending from the first side to the second side, the trailing edge having a tapered portion. The write head also includes a spin torque oscillator formed entirely on the tapered portion of the trailing edge of the write pole, and having first and second sides that are aligned with the first and second sides of the write pole, and further includes a non-magnetic side gap layer formed at the first and second sides of the write pole and first and second sides of the spin torque oscillator.

The write head can be manufactured by a process that includes, depositing a magnetic write pole material, and forming first mask structure over the magnetic write pole material, the first mask structure having an edge located a desired distance from an air bearing surface plane. Then, a first ion milling can be performed in such a manner that shadowing form the first mask structure causes the ion milling to form a tapered upper surface on the magnetic write pole material. A spin torque oscillator material is deposited over the write pole material, and a second mask structure is formed that is configured to define a stripe height of a spin torque oscillator such that the spin torque oscillator terminates on the tapered upper surface of the write pole material. Then, a second ion milling is performed to remove material not protected by the second mask structure, and a third mask structure is formed that is configured to define a write pole shape including a write pole track-width. Then, a third ion milling is performed to remove portions of the spin torque oscillator material and write pole material that are not protected by the third mask structure, thereby forming a spin torque oscillator over a write pole, the spin torque oscillator being self aligned with a track width of the write pole.

The first ion milling is preferably performed so that the tapered portion of the upper surf (trailing edge) of the write pole defines an angle of not greater than 25 degrees with respect to the plane of the as deposited layers (e.g. with respect to the surface of the as deposited write pole material). More preferably, this angle is 10-25 degrees.

These and other features and advantages of the invention will be apparent upon reading of the following detailed description of preferred embodiments taken in conjunction with the figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
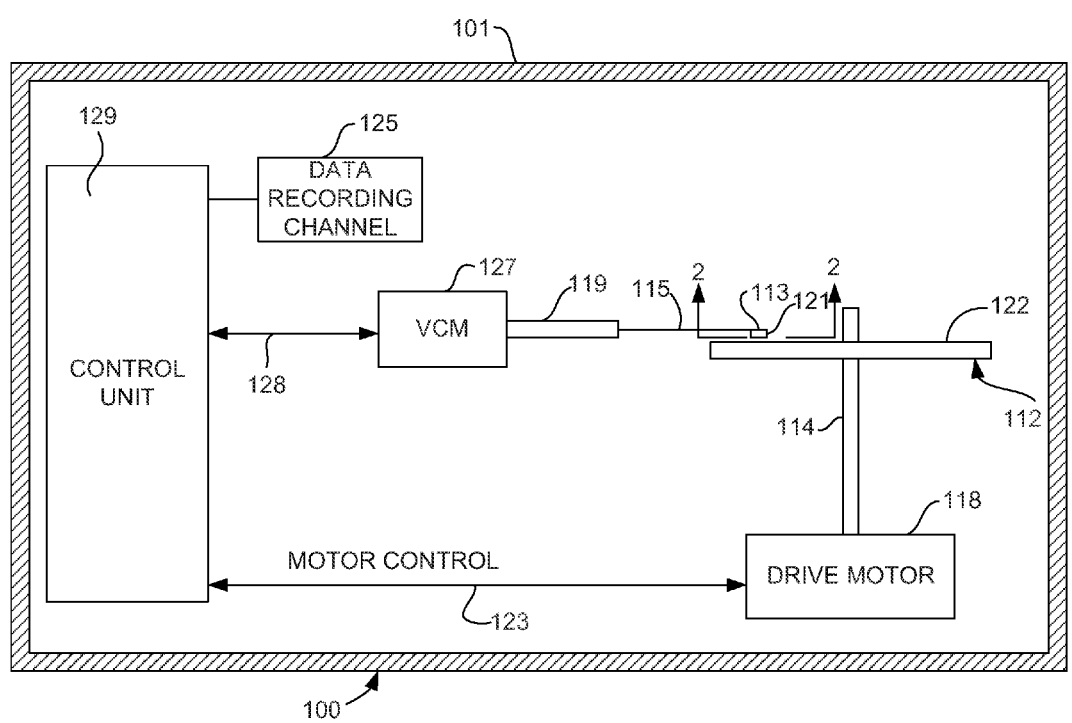
FIG. 1 is a schematic illustration of a disk drive system in which the invention might be embodied.

Referring now to FIG. 1, there is shown a disk drive 100 embodying this invention. The disk drive 100 includes a housing 101. At least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
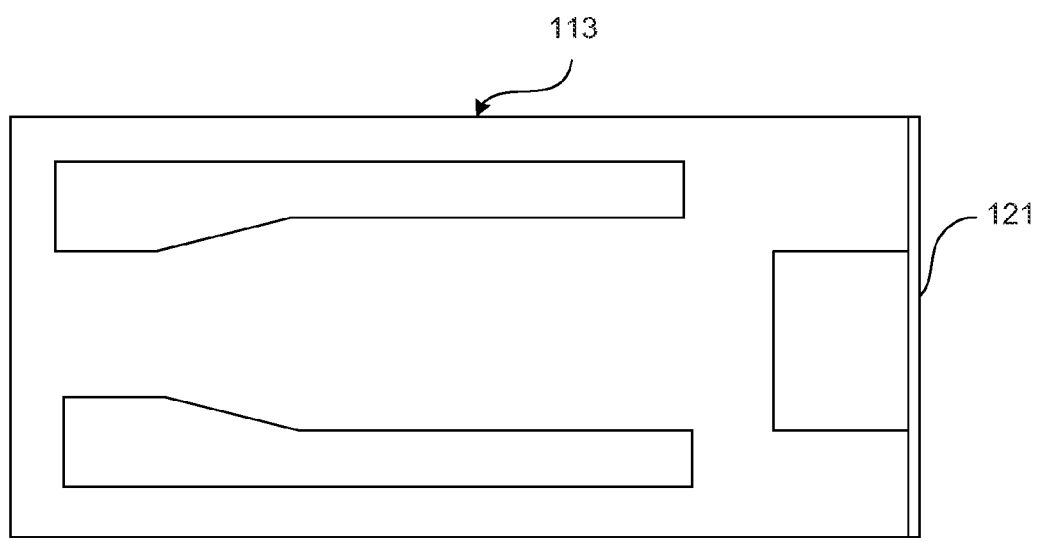
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
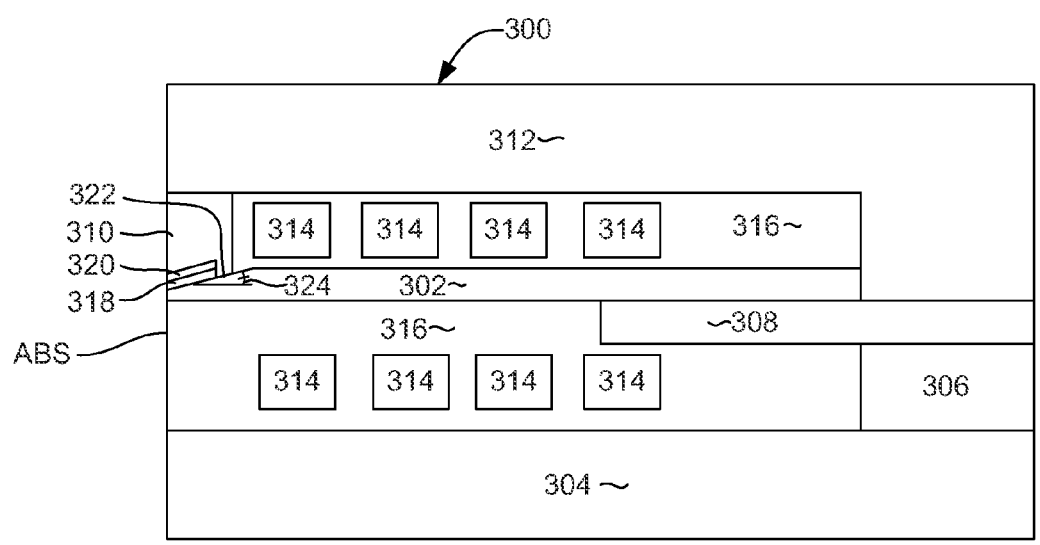
FIG. 3 is side, cross sectional view of a magnetic write head.

FIG. 3 shows a side cross sectional view of a magnetic write head according to an embodiment of the invention, such as might be formed on a slider 113 (FIG. 1). The magnetic write head 300 includes a write pole 302 that has an end extending to an air bearing surface (ABS). The write head 300 can also include a leading magnetic return pole 304. The leading magnetic return pole 304 is magnetically connected with the write pole 302 by a magnetic back gap structure 306 that is located away from the ABS, and by a magnetic shaping layer 308 that can focus magnetic flux to the tip of the write pole 302.

A trailing agnetic shield 310 can be located at the ABS adjacent to the trailing edge of the write pole 302. The trailing magnetic shield 310 helps to increase the write field gradient, thereby improving magnetic writing performance. The trailing magnetic shield can be magnetically connected with a trailing magnetic return pole 312 that can help to conduct magnetic flux to the back of the write head 302.

The write head 300 also includes a non-magnetic electrically conductive write coil 314 shown in cross section in FIG. 3 passing above and below the write pole 302. The write coil 314 can be constructed of a material such as Cu and can be embedded in one or more layer of non-magnetic, electrically insulating material such as alumina 316.

A spin torque oscillator 318 is formed at the trailing edge of the write pole 302, and a non-magnetic trailing gap layer 320 may optionally be sandwiched between the spin torque oscillator 318 and the trailing shield 310. The spin torque oscillator 318, an example of which will be described in greater detail herein below, generates an oscillating magnetic field that magnetically excites the magnetic media (not shown in FIG. 3), thereby making it easier for the write head to write data to the magnetic media.

In FIG. 3 it can also be seen that the write pole 302 has a tapered trailing edge portion 322, where the trailing edge of the write pole slopes downward to further facilitate the channeling of magnetic flux to the pole tip for increased write field density.

Figure 4:
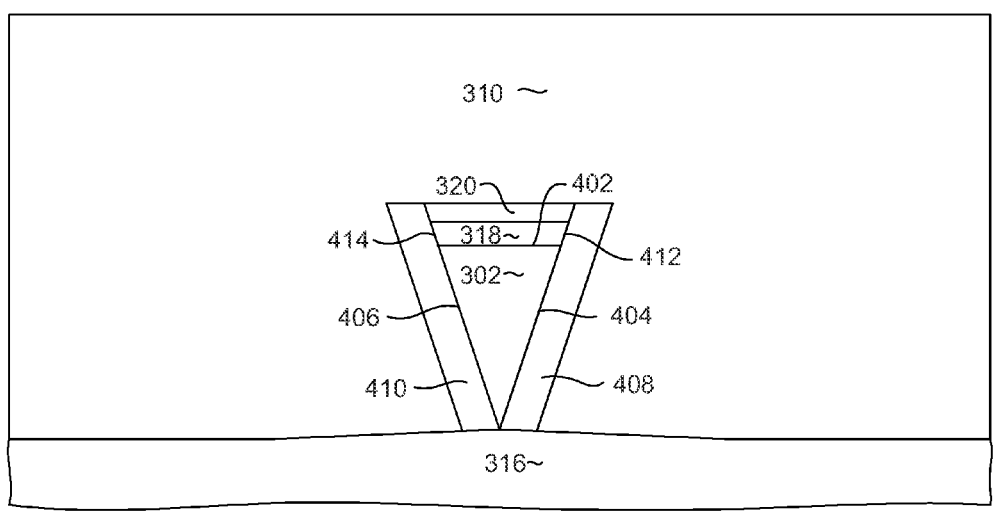
FIG. 4 is an enlarged air bearing surface view of the write head of FIG. 3.

FIG. 4 shows an enlarged, air bearing surface view of the write pole 302 and surrounding structure of the write head 300. In FIG. 4, it can be seen that the write pole 302 has a triangular (or possibly trapezoidal) shape with a trailing edge 402 and first and second sides 404, 406. It can also be seen that the trailing shield 310 can wrap around the side of the write pole 302, the shield 310 being separated from the sides 404, 406 of the write pole 302 by non-magnetic side gap layers 408, 410, which can be constructed of a non-magnetic material such as alumina ($Al_2O_3$).

With continued reference to FIG. 4, it can also be seen that the spin torque oscillator 318 has sides 412, 414 that are perfectly aligned with the sides 404, 406 of the write pole 302. Similarly, the trailing gap layer 320 is also aligned with the sides of the spin torque oscillator 318 and sides 404, 406 of the write pole 302. This alignment of the spin torque oscillator 318 with the write pole 302 improves magnetic performance by providing spin torque oscillation exactly where it is needed and in a symmetrical manner. This alignment of the spin torque oscillator 318 with the write pole 302 is made possible by a unique manufacturing method that will be discussed in greater detail herein below.

With reference again to FIG. 3, it can be seen that the spin torque oscillator 318 is formed entirely on the sloped portion 322 of the trailing edge of the write pole 302. Locating the spin torque oscillator 318 entirely on the sloped portion 322 ensures that the spin torque oscillator will be flat (as opposed to the shape it would have if it were to extend beyond the sloped portion in which case it would have to bend). The spin torque oscillator 318 is, therefore, located at an angle as a, result of being formed on the sloped portion 322. As discussed above, the sloping of this portion 322 of the write pole trailing edge helps to conduct flux to the pole tip for increasing magnetic write field. However, since, the spin torque oscillator is located on the angled sloping portion 322 of the trailing edge of the write pole 302, the spin torque oscillator 318 will itself be formed at this same angle. This mean that the oscillating magnetic field emitting from the spin torque oscillator will also be angled. In addition, a higher angle of the surface 322 makes accurate, high quality deposition of the layers of the spin torque oscillator 318 more difficult, resulting in diminished performance of the spin torque oscillator. The inventors have found however, surprisingly, that even though the spin torque oscillator is angled in this manner, an optimal write head performance advantage can be achieved by locating the spin torque oscillator 318 on this sloping surface 322 as long as certain condition are met. A balance must be struck between the need to increase the funneling of magnetic flux to the pole tip by use of the sloping surface 322 of the write pole 302 and providing an effective oscillating magnetic field from the spin torque oscillator 318. Both of these benefits can be mutually achieved when the angle 324 of the surface 322 is not greater than 25 degrees. More preferably, the angle 324 is 10-25 degrees. The angle 324 is measured with respect to a plane that is parallel with the as deposited layers (or parallel with the wafer on which the write head 300 is formed, the wafer not being shown in FIG. 3). In other words, the angle 324 is measured with respect to a plane that is perpendicular to the air bearing surface.

Figure 5:
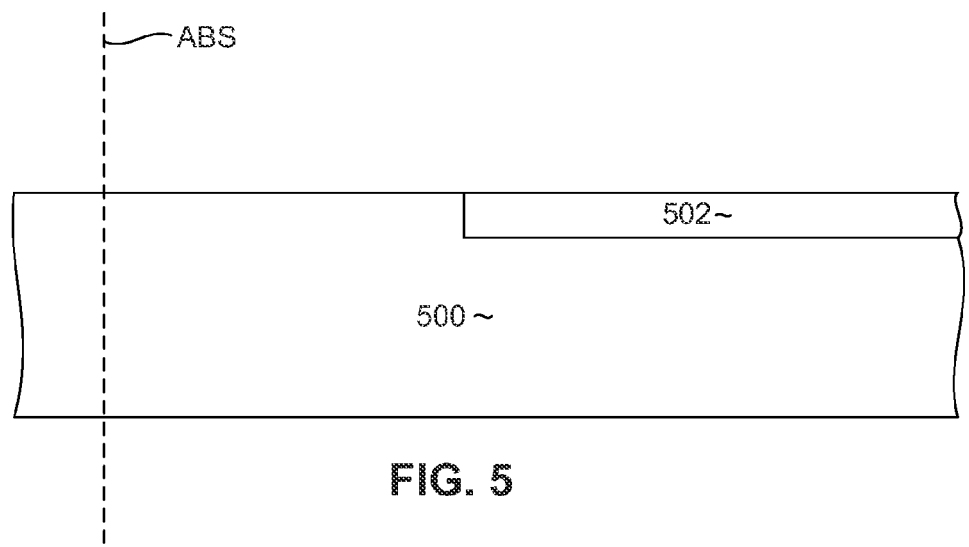
FIGS. 5-25 are views of a magnetic write head in various intermediate stages of manufacture, illustrating a method for manufacturing a magnetic write head.

FIGS. 5-25 illustrate a method for manufacturing a magnetic write head having a self aligned spin torque oscillator. With particular reference to FIG. 5, a shaping layer 502 is formed so as to be embedded within a substrate 500, such as alumina. FIG. 5 shows a side cross sectional view perpendicular to an intended air bearing surface plane indicated by the dashed line denoted ABS (the air bearing surface not actually having been yet formed as will be appreciated by those skilled in the art). The shaping layer 502 could also be connected with a magnetic back gap structure such as the shaping layer 308 and back gap 306 of FIG. 3. Similarly, the substrate 500 can include the non-magnetic fill layer 316 of FIG. 3. As shown in FIG. 5, the substrate 500 and shaping layer 502 can have a smooth coplanar upper surface that can be achieved by use of a chemical mechanical polishing (CMP).

Figure 6:
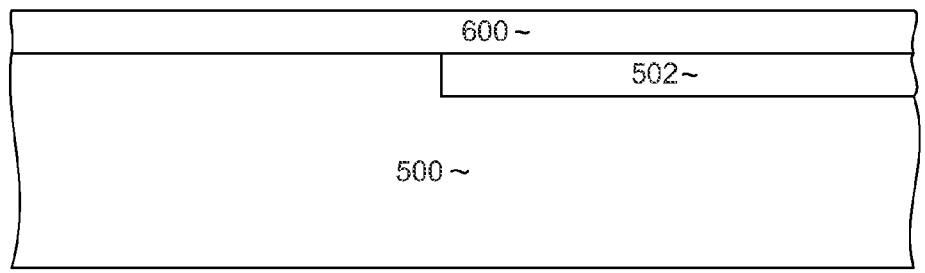

With reference now to FIG. 6, a write pole material 600 can be deposited. The write pole material 600 can be deposited by a process such as sputter deposition or electroplating.

Figure 7:
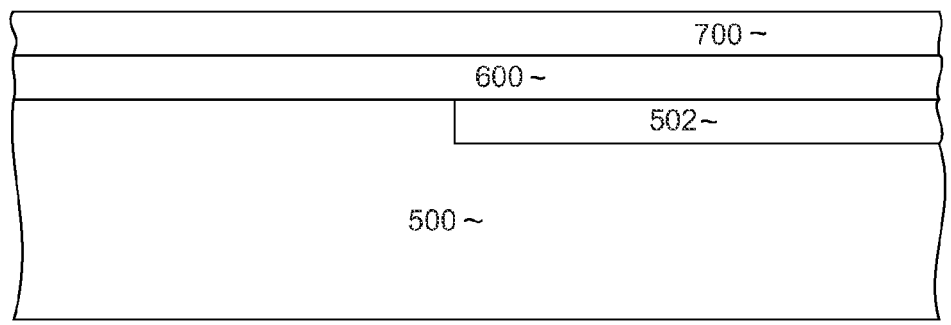

With reference now to FIG. 7, a relatively thick hard mask material 700 is deposited over the write pole material 600. This hard mask material 700 is preferably silicon carbide (SiC), however other materials could be used as well.

Figure 8:
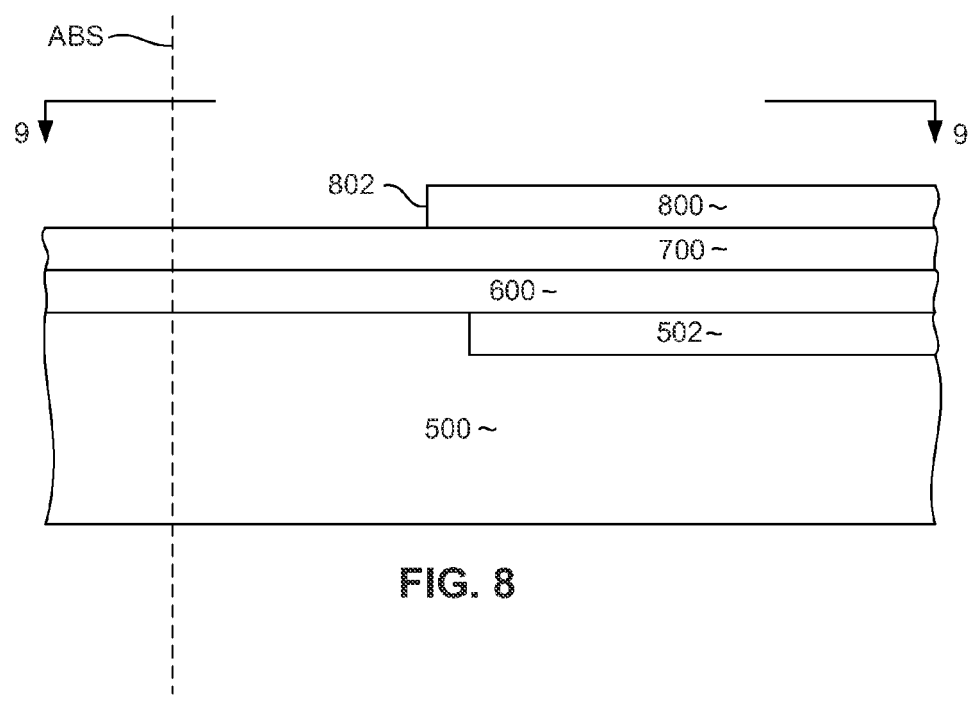
Figure 9:
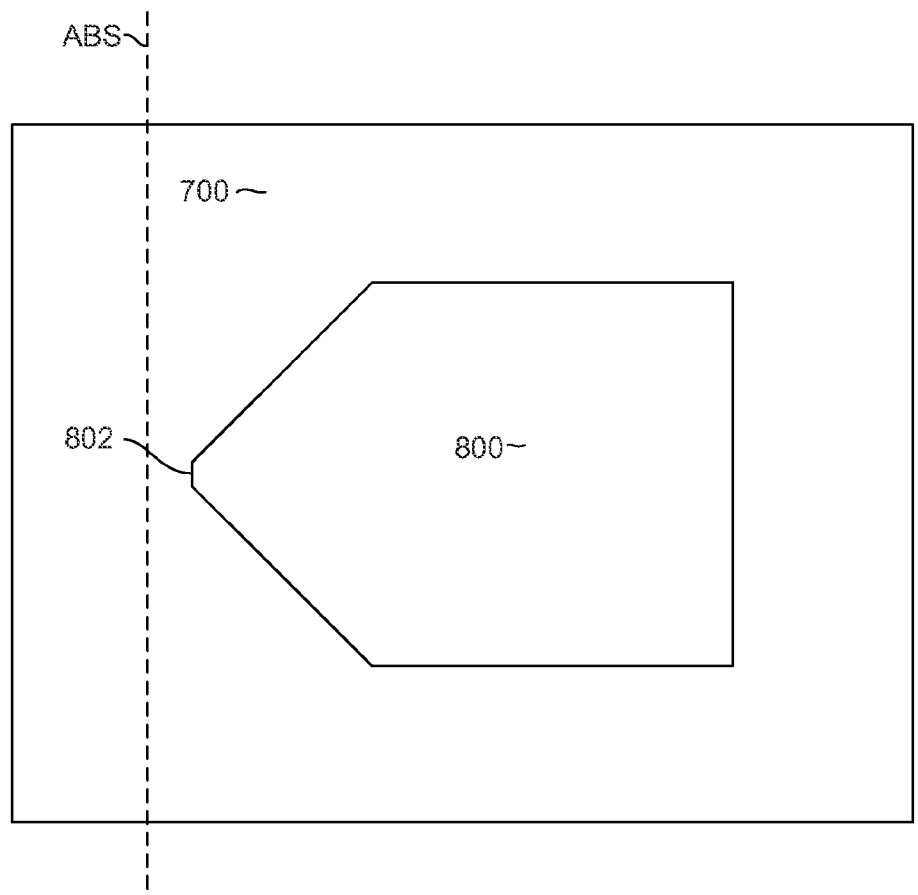

Then, with reference to FIGS. 8 and 9, a first mask 800 is formed. FIG. 9 is a top down view as seen from line 9-9 of FIG. 8. In FIG. 8 it can be seen that the mask 800 has an edge 802 that is located a desired distance from the air bearing surface ABS. This will define the location of the back edge of the trailing edge taper as will be seen. The mask 800 can be a photoresist mask, but can include other layers as well, such as one or more hard masks, an image transfer layer, an anti-reflective coating (BARC), etc.

Figure 10:
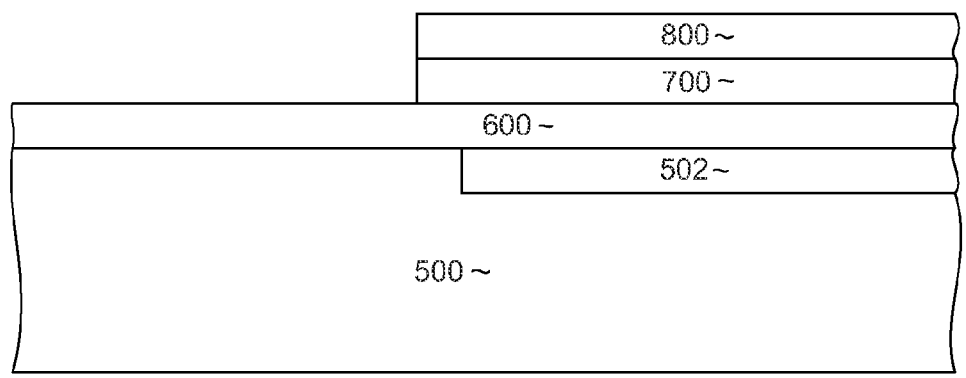
Figure 11:
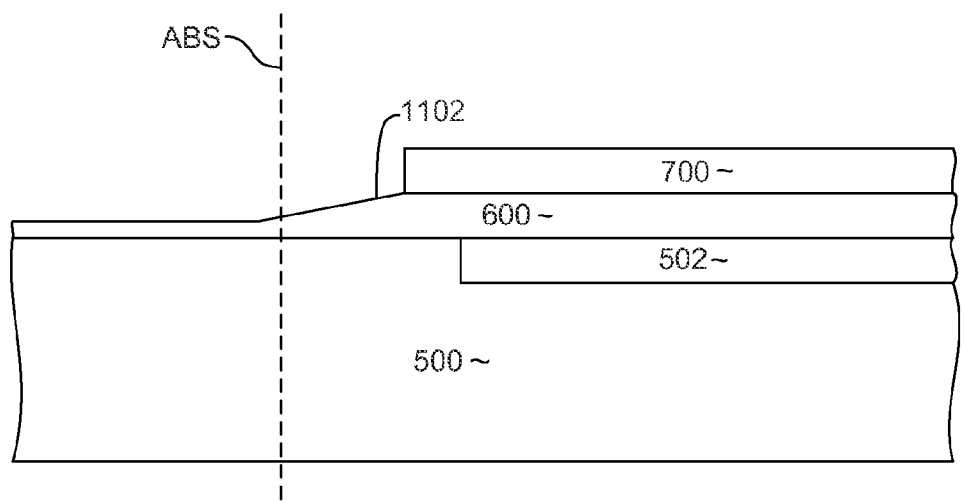

With reference now to FIG. 10, a reactive ion etching is performed to transfer the image of the mask 800 onto the under-lying hard mask 700. Then, an ion milling is performed to remove a portion of the write pole material that is not protected by the hard mask 800. This ion milling is preferably performed in a sweeping manner and at an angle relative to normal so that shadowing from the hard mask layer 800 causes the ion milling to form a tapered portion, resulting in a shape as shown in Fig. H. The ion milling is performed in such a manner to form the tapered portion with an angle of not greater than 25 degrees, preferably 10-25 degrees relative to horizontal. After the taper has been formed, the hard mask layer 700 can be removed, such as by reactive ion etching, or can optionally be left in the finished write head as determined by design requirements.

Figure 12:
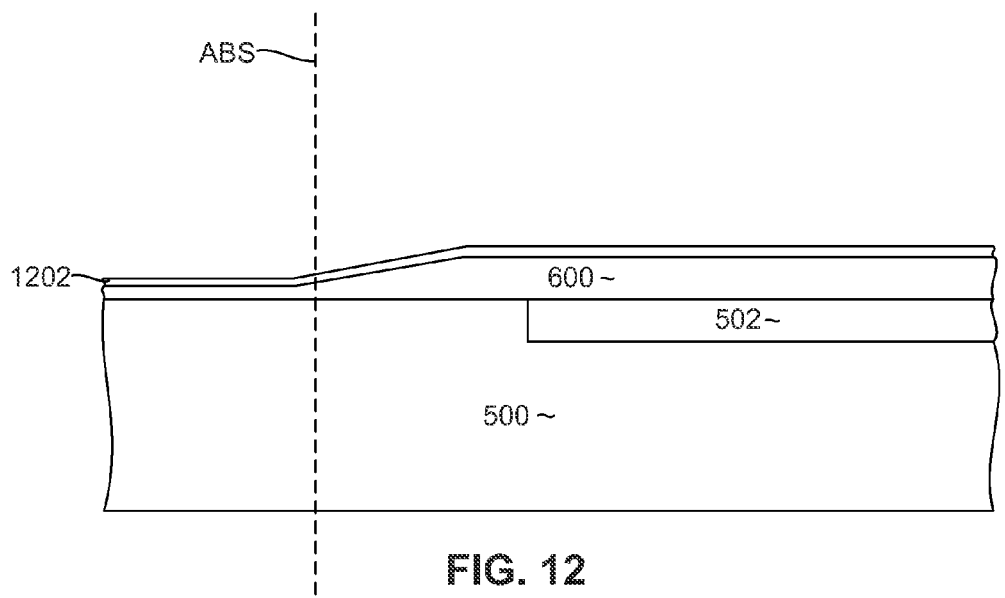
Figure 13:
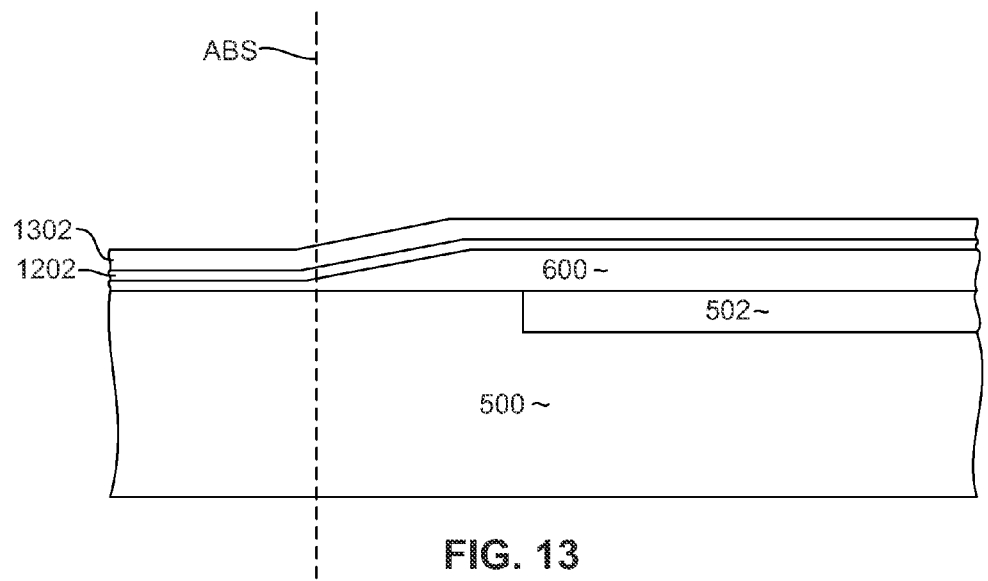

Then, with reference to FIG. 12, a spin torque oscillator material 1202 is deposited full film. While the spin torque oscillator can comprise several layers, this series of layers will be referred to generally herein as spin torque oscillator layer 1202 for purposes of clarity. One example of a spin torque oscillator that may be constructed from layer 1202 will be described herein below. However, this is by way of example only, as various other spin torque oscillator designs could be used.

After the spin torque oscillator material 1202 has been deposited, a trailing shield seed layer 1302 is deposited. The trailing shield seed layer 1302 is an electrically conductive material and can be a high magnetic saturation moment (high Bsat) that can function as a part of the trailing shield (yet to be formed). Alternatively, if additional trailing gap spacing is needed, the seed layer 1302 can be an electrically conductive non-magnetic material so that it can function as a gap layer as well as an electroplating seed. To this case, the trailing shield seed layer 1302 can be Ru or Rh.

Figure 14:
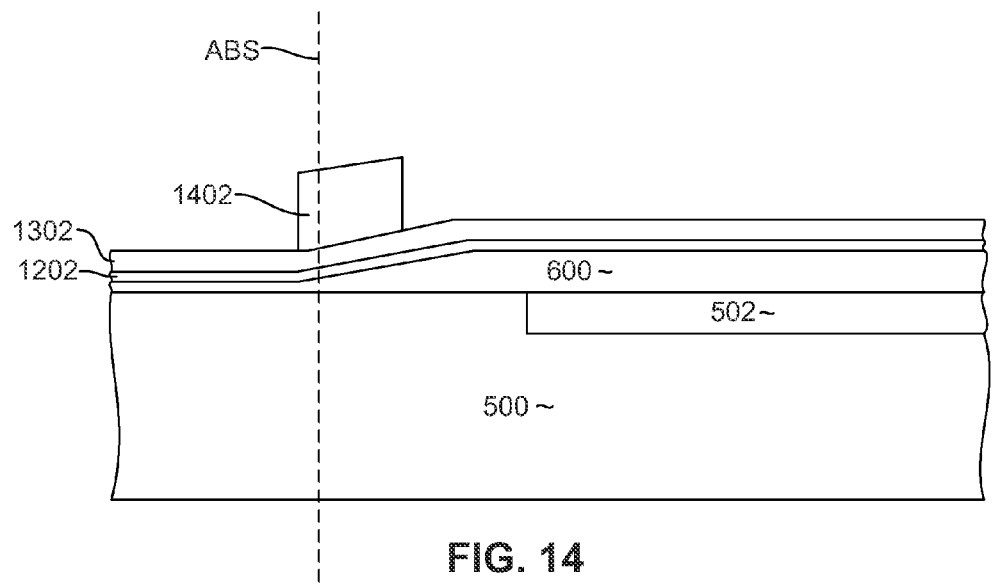
Figure 15:
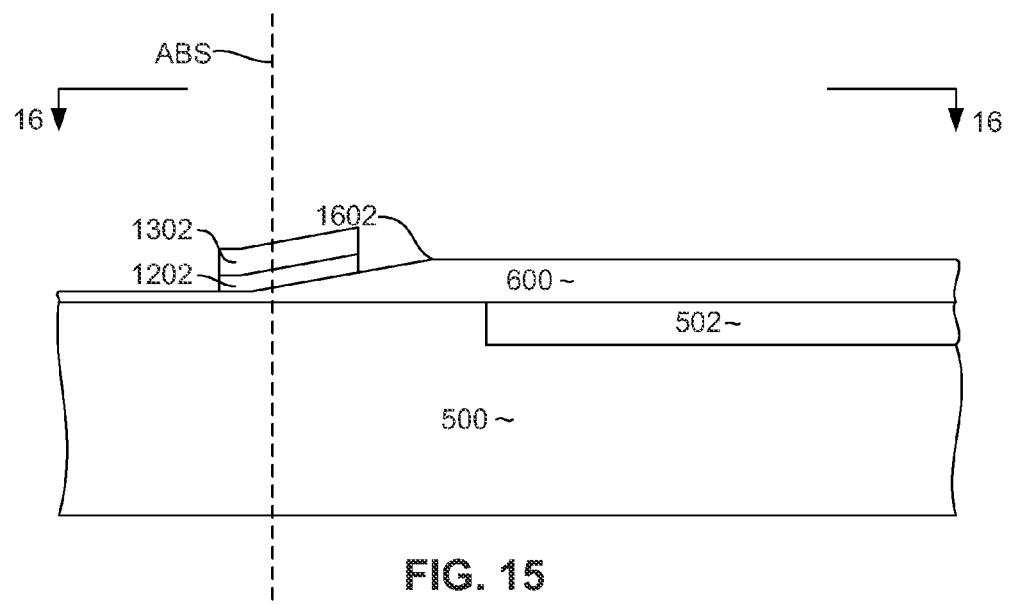
Figure 16:
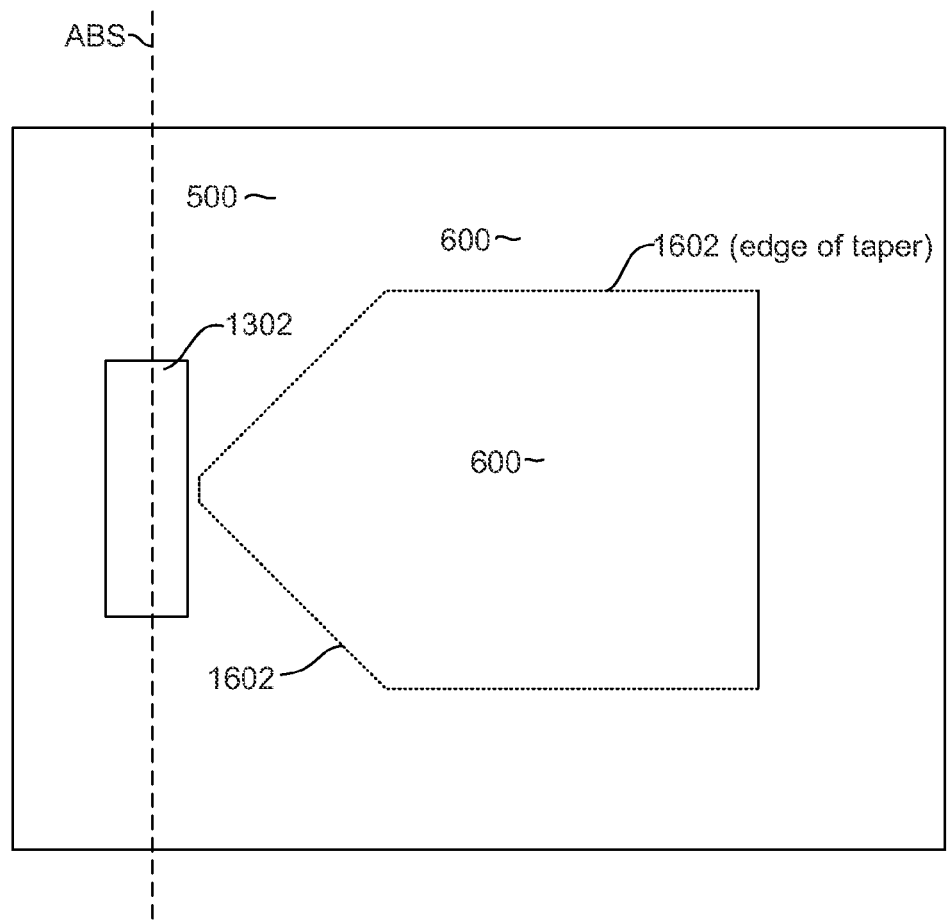
Figure 17:
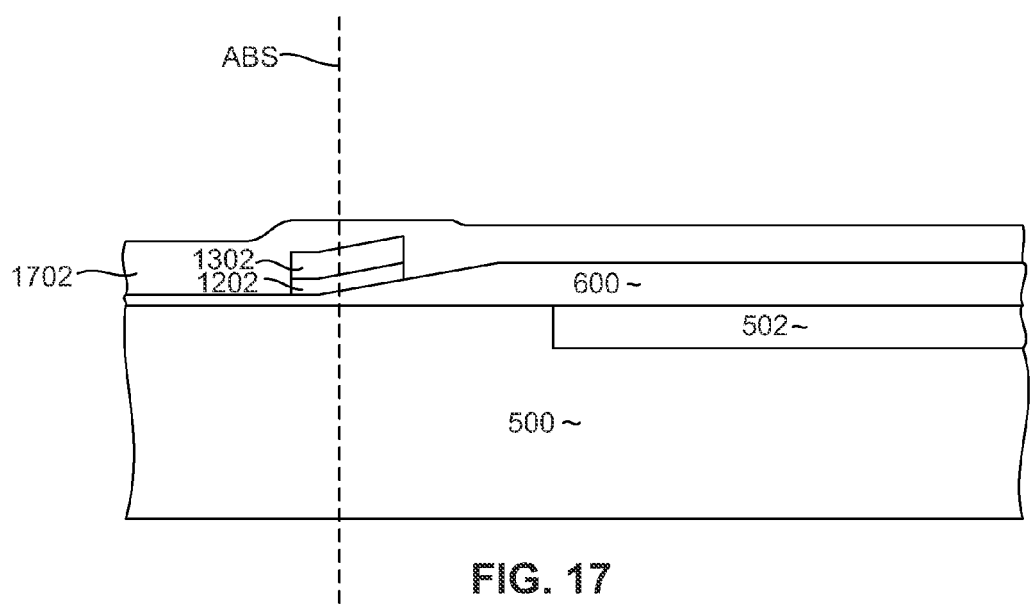
Figure 18:
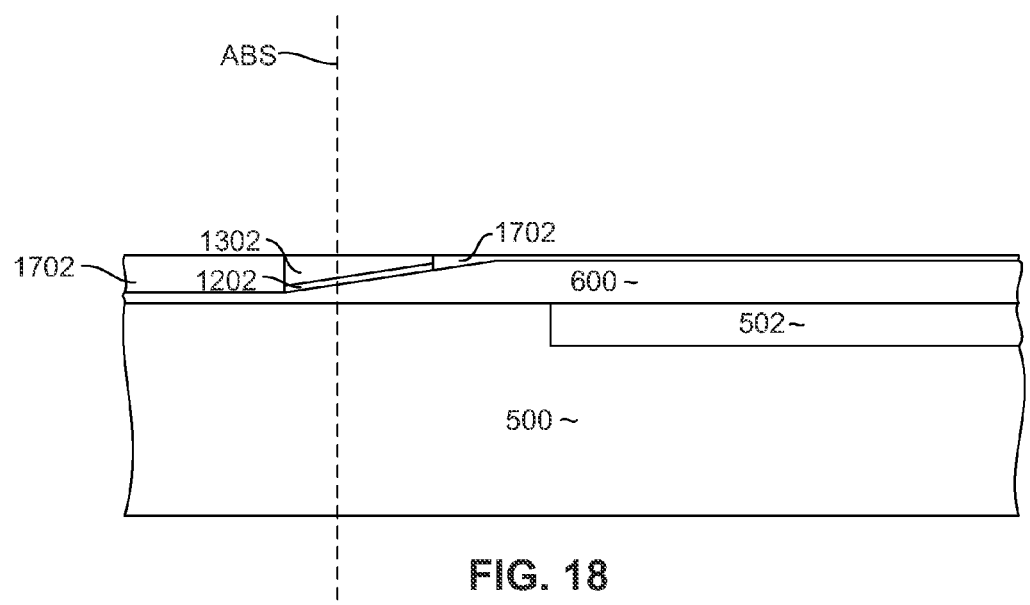

With reference now to FIG. 14, a mask 1402 is formed that has a shape configured to define a stripe height of the spin torque oscillator as measured from the air bearing surface (ABS). The mask 1402 can include a layer of photolithographically patterned photoresist, but can also include other layers as well, such as one or more hard mask layers, an image transfer layer, an anti-reflective coating etc. While the mask 1402 has a depth as measured as measured from the air bearing surface plane (ABS) that is configured to define the stripe height of the spin torque oscillator, it is wider (in a direction out of the plane of the page in FIG. 15) than the yet to be formed write pole, as will become clearer below. After the mask 1402 has been formed, an ion milling process can be performed to remove portions of the trailing shield seed layer 1302 and spin torque oscillator material 1202 that are not protected by the mask 1402, stopping at the write pole material 600. The mask 1402 can be removed, leaving a structure as shown in FIG. 15. FIG. 16 shows a top down view as seen from line 16-16 of FIG. 15. In FIG. 15, the dotted line indicates the location of the initiation 1602 of the tapered portion as previously formed. Also, as can be seen in FIG. 16, the configuration of the layer 1302 (and layer 1202 hidden thereunder) is wide (in the up and down direction in FIG. 9), which is useful for reasons that will become apparent below. With reference now to FIG. 17, a non-magnetic fill layer 1702 such as alumina is deposited. Then, a chemical mechanical polishing process (CMP) is performed to planarize the surface of the fill layer and expose the trailing shield seed layer 1302, leaving a structure as shown in FIG. 18.

Figure 19:
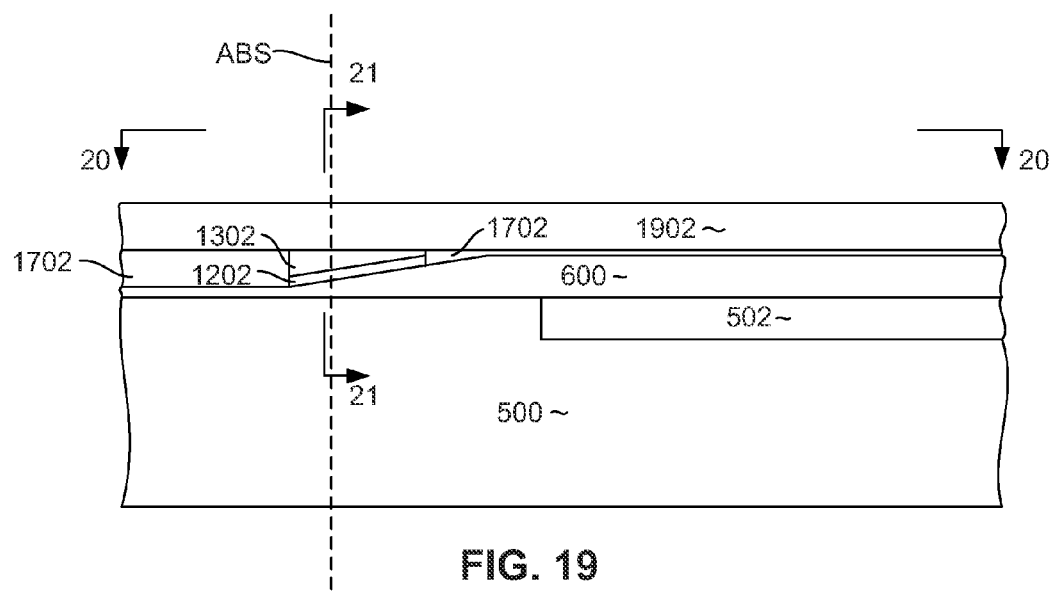
Figure 20:
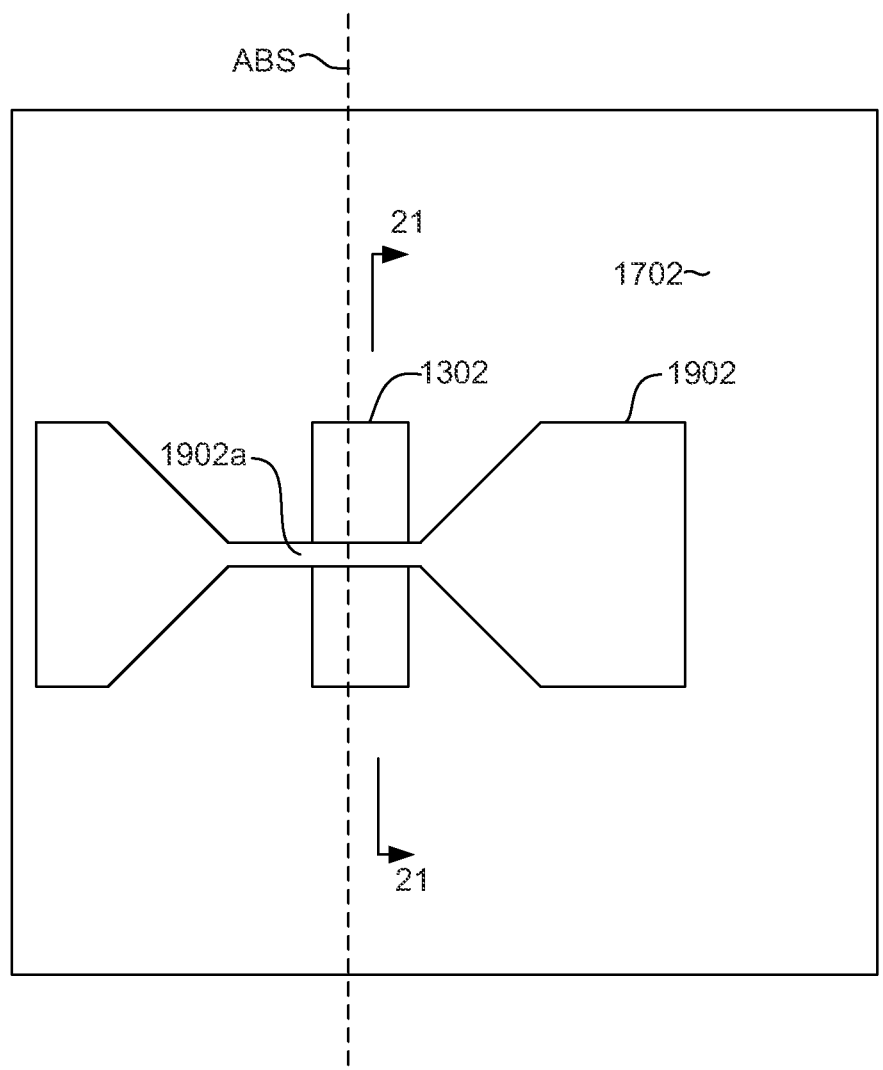
Figure 21:
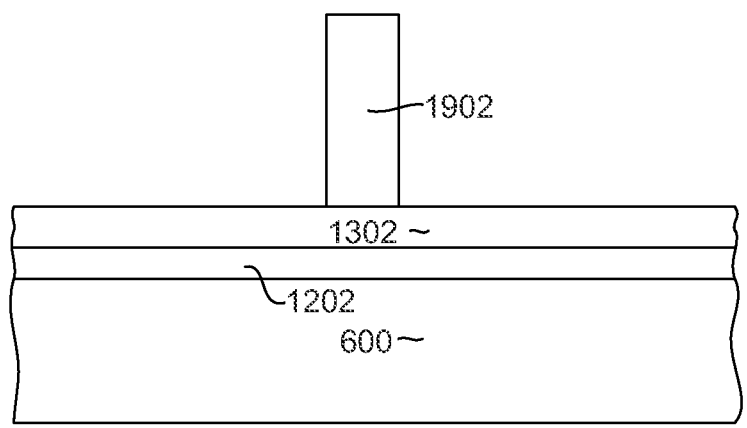

With reference now to FIG. 19, another mask structure 1902 is formed. The shape of this mask structure can be better understood with reference to FIG. 20, which shows a top-down view as seen from line 20-20 of FIG. 19. The previously performed CMP process formed a smooth, planar surface on which to form the mask 1902. This greatly facilitates accurate photolithographic definition of the mask 1902 which defines important write pole dimensions such as track-width and flare point. Any topography on the surface on which the mask 1902 is formed would compromise the patterning of the mask as a result of factors such as reflectivity of the surface. In FIG. 20 it can be seen that the mask 1902 is configured to define the shape of a write pole with a narrow track-width portion 1902a being located over the location of the previously defined seed layer 1302 (and spin torque oscillator 1202 hidden thereunder in FIG. 20). FIG. 21 is a view taken from line 21-21 of FIG. 20, showing a plane parallel with and near or at the ABS plane. In FIG. 21 it can be better seen that the mask 1902 is configured to define a width of the write pole material 600 as well as the spin torque oscillator 1202 and trailing shield seed layer 1302. As with the previously described masks, the mask 1902 can include a layer of photolithographically patterned photoresist and may include other layers such as one or more hard mask layers, an image transfer layer, a bottom anti-reflective coating (BARC), etc.

Figure 22:
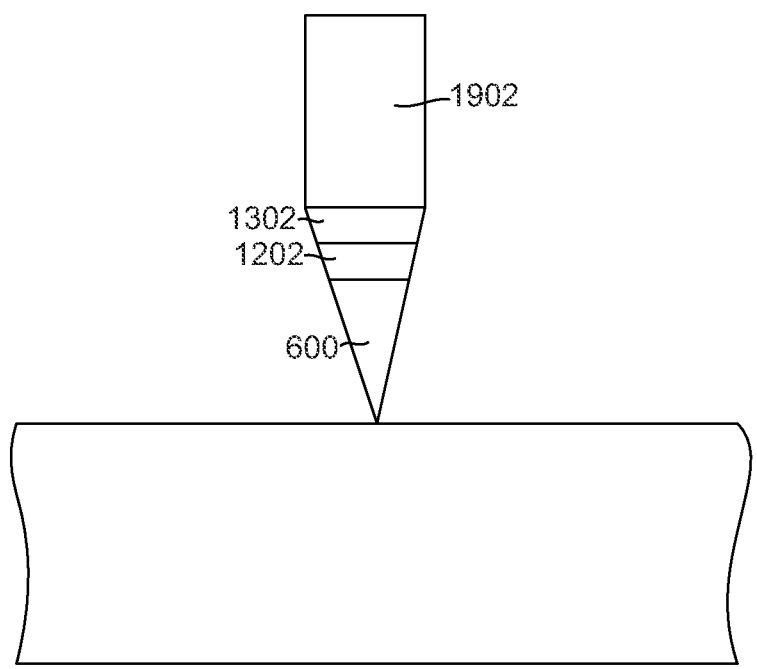

With reference now to FIG. 21, an ion milling is performed to remove portions of the trailing shield seed layer 1302, spin torque oscillator layer 1202 and write pole material 600 that are not protected by the mask 1902. The ion milling can be a sweeping ion milling and is preferably performed at one or more angles relative to normal so as to form the write pole 600 with tapered sides so that the write pole has a tri-angular or trapezoidal shape when viewed as a cross section of a plane parallel with the ABS. In FIG. 22 it can also be seen that the spin torque oscillator has sides that are perfectly aligned with the sides of the write pole 600.

With previous processes for defining a spin torque oscillator, the spin torque oscillator was defined by a separate photolithographic patterning step and milling step than that used to define the write pole. This inevitably led to some amount of misalignment between the spin torque oscillator and the write pole. The process described above overcomes this, forming a spin torque oscillator 1202 that is perfectly aligned with the write pole 600. After the ion milling has been performed, any remaining mask material 1902 can be removed by chemical liftoff, reactive ion etching or a combination of these.

Figure 23:
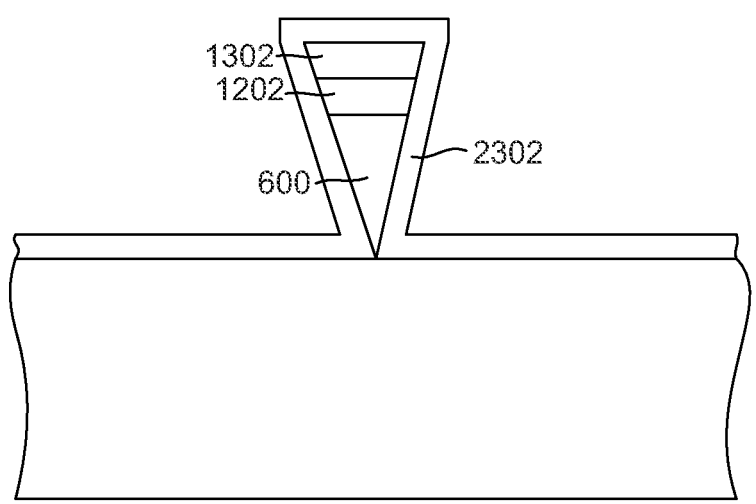
Figure 24:
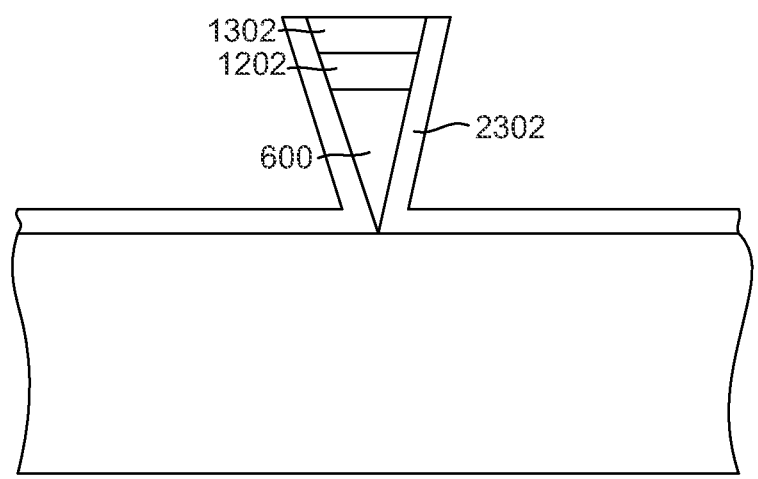

With reference now to FIG. 23, a non-magnetic side gap material 2302 is deposited. The side gap material 2302 can be a material such as alumina and can be formed by a conformal deposition step such as atomic layer deposition, to a thickness that is chosen to define a desired side gap thickness. Another ion milling can be performed to remove side gap material 2302 from the area over the top of the write pole 600, spin torque oscillator 1202 and trailing gap layer, using the trailing gap/seed layer 1302 as an end point detection layer leaving a structure as shown in FIG. 24.

Figure 25:
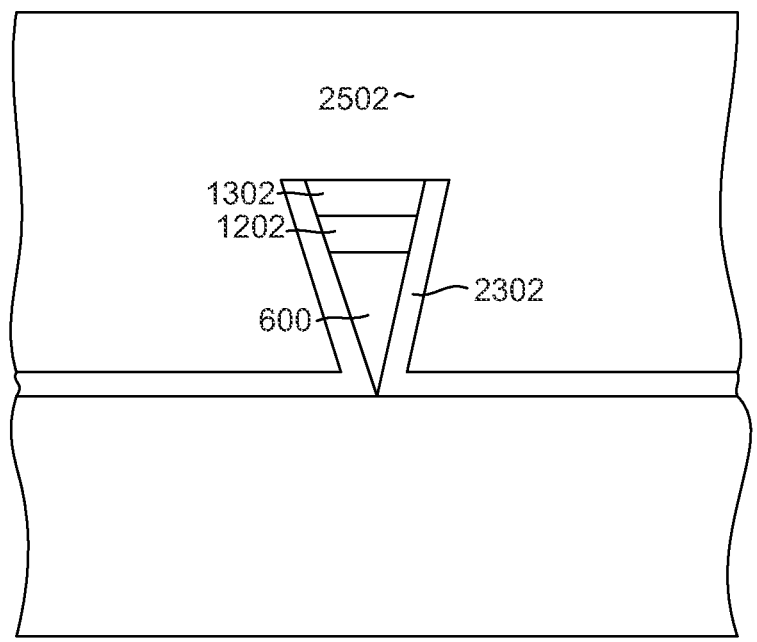

With reference now to FIG. 25, a trailing, wrap-around magnetic shield 2502 can be formed by electroplating a magnetic material such as NiFe. The electrically conductive non-magnetic gap material 1302 can be used as a seed layer for this electroplating.

Figure 26:
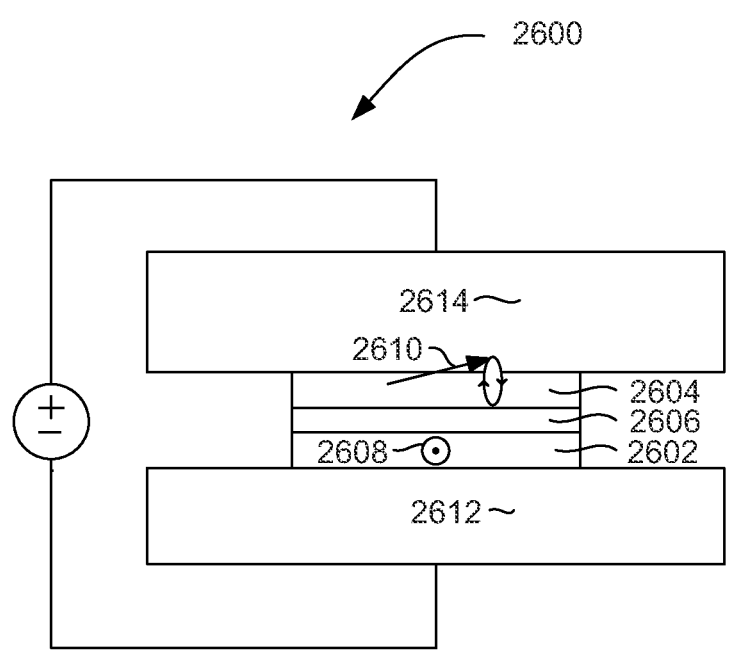
FIG. 26 is a schematic view illustrating an example of a spin torque oscillator.

FIG. 26 schematically illustrates one possible example of a spin torque oscillator. It should be understood that other types and designs could be used as well. FIG. 26 shows a spin torque oscillator 2600 that includes a magnetic pinned layer 2602, a magnetic free layer 2604 and a non-magnetic layer 2606 sandwiched between the magnetic pinned layer 2602 and magnetic free layer 2604. The non-magnetic layer 2606 can be an electrically conductive spacer layer such as Cu or can be an electrically insulating barrier layer such as alumina ($Al_2O_3$) or MgO. The magnetic pinned layer 2602 has a magnetization 2608 that is pinned in a first direction. Pinning of the magnetization 2608 can be provided by various sources such as by exchange coupling with a layer of antiferromagnetic material (not shown). Similarly the magnetic free layer 2604 has a magnetization 2610 that is biased in a direction that is perpendicular to the magnetization 2608 of the pinned layer 2602, but which is free to move about this biased position. Biasing of the magnetization 2610 can be provided by various mechanisms such as hard or soft bias layers (not shown). The layers 2602, 2606, and 2604 are sandwiched between first and second electrodes 2612, 2614, which provide an electrical current through the layers 2602, 2606, 2604. This causes the magnetization 2610 of the free layer 2604 to oscillate in a precessional manner as shown in FIG. 26. This oscillation results in an oscillating magnetic field that magnetically excites the magnetic media (not shown in FIG. 26) in order to facilitate writing to the magnetic media. In the write head of FIGS. 3 and 4, the write pole 302 and shield 310 can serve the function of the electrical leads 2612, 2614 in FIG. 26.

To better understand the benefits of the write head structure described above with reference to FIGS. 3 and 4, and the benefits of manufacturing a write head according to a method such as that described above with reference to FIGS. 5-25, it is helpful to compare such structure and method with a prior art method of manufacturing a magnetic write head and spin torque oscillator. FIGS. 27-39 illustrate a prior art method of manufacturing a magnetic write head and spin torque oscillator using a damascene process to form the write pole and a separate photolithographic patterning step to form the spin torque oscillator.

Figure 27:
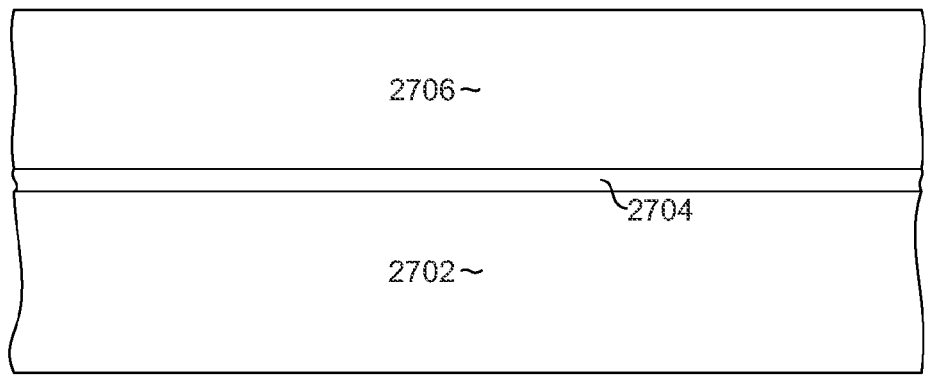
FIGS. 27-39 are views of a magnetic write head in various intermediate stages of manufacture, illustrating a prior art method for manufacturing a magnetic write head.
Figure 28:
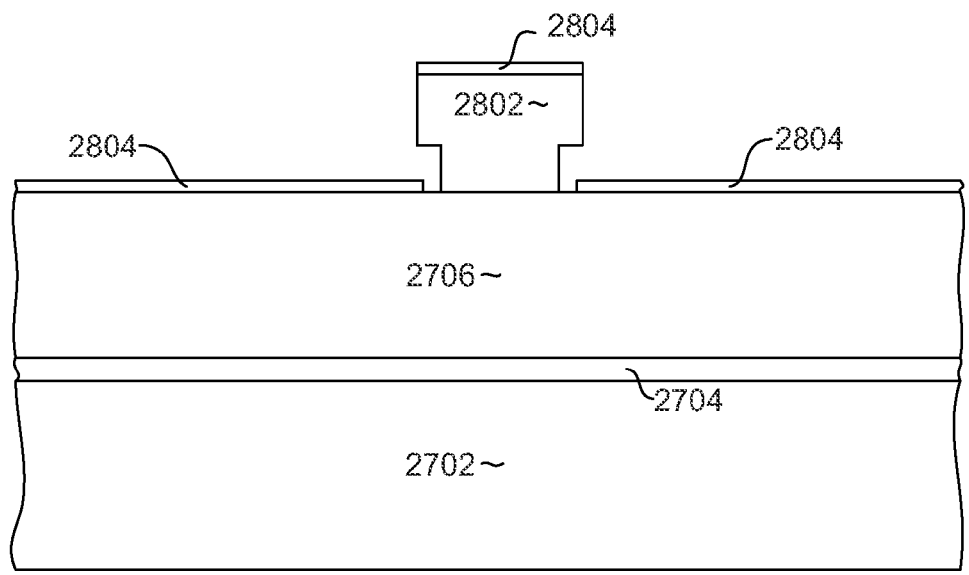

With reference to FIG. 27, a substrate 2702 is provided. The substrate can include a leading magnetic shield and/or a non-magnetic, electrically insulating fill layer such as alumina. A layer of a material that is resistant to reactive on etching (RIE stop layer) 2704 is deposited over the substrate, and a fill layer that is removable by reactive ion etching (RIAable fill layer) 2706 is deposited over the RAE stop layer 2704. With reference to FIG. 28, a mask 2802 is formed over the RIEable fill layer 2706. The mask can be a bi-layer photoresist mask having overhanging edges as shown. The mask 2802 is configured to define the shape of a write pole defining trench as will be seen. With the mask formed, a layer of hard mask material 2804 is deposited. This is a material that is resistant to a trench defining reactive ion etching as will be seen.

Figure 29:
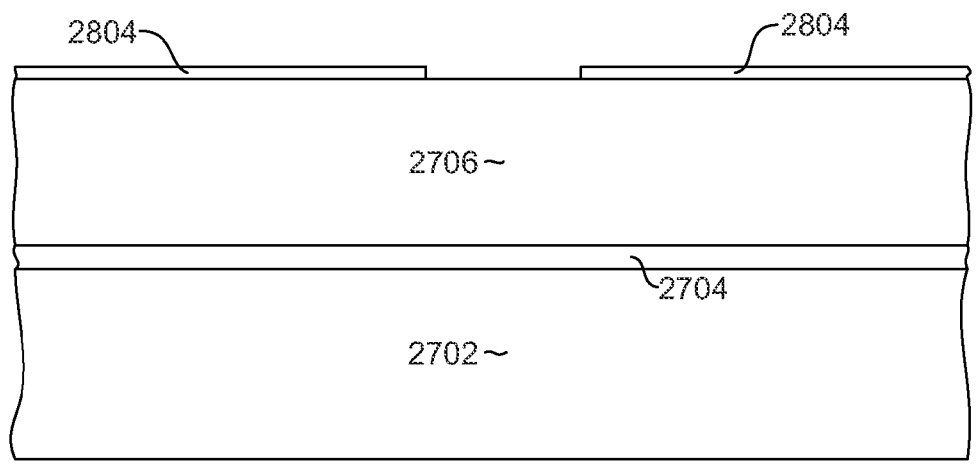
Figure 30:
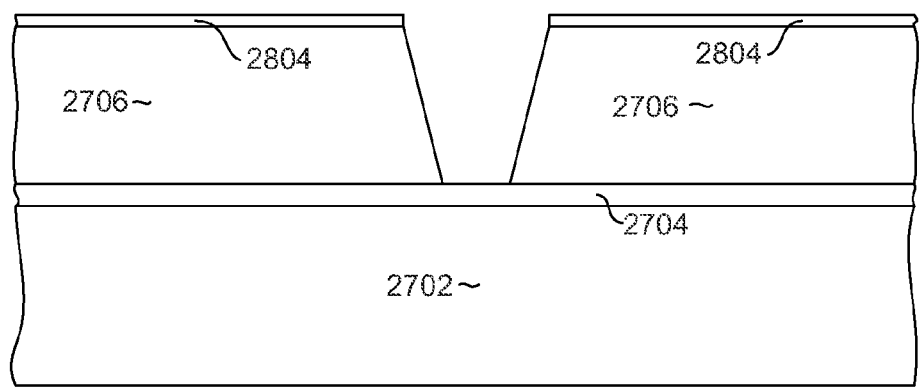

The mask 2802 can then be lifted off, leaving a structure shown in FIG. 29. As can be seen, the removal of the mask 2802 (FIG. 28) leaves an opening in the hard mask layer 2804. Then, a reactive ion etching is performed to remove a portion of the RIE fill layer 2706 that is not protected by the hard mask 2804, leaving a structure as shown in FIG. 30. The reactive ion milling is performed in such a manner as to form tapered sides on the trench formed in the RIEable fill material.

Figure 31:
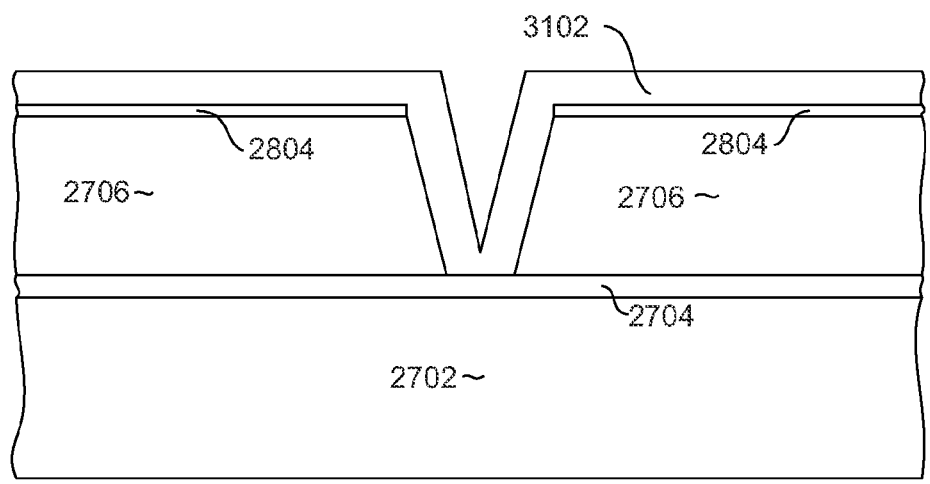
Figure 32:
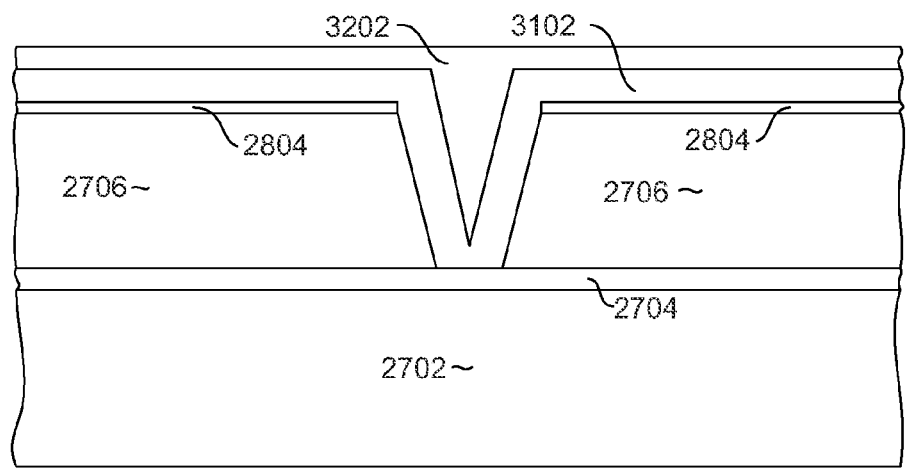
Figure 33:
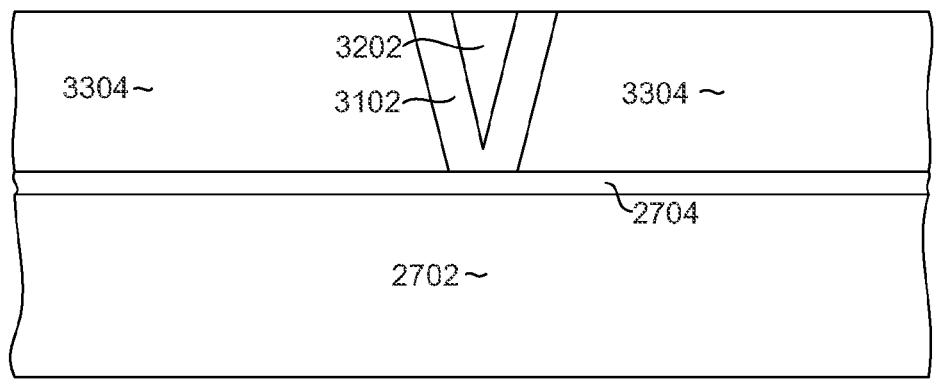

Then, with reference to FIG. 31, a layer of non-magnetic side gap material 3102 is deposited full film so that it forms a non-magnetic wall on the sides and bottom of the trench formed in the RIEable fill material 2706. A magnetic material 3202 can then be electroplated over the nonmagnetic side gap material 3102 as shown in FIG. 32. This material 3202 will make up the magnetic write pole. Then, a chemical mechanical polishing process is performed to planarize the structure and remove portions of the electroplated magnetic material 3202 located outside of the trench. A reactive ion etching can be used to remove any remaining hard mask material 2804 as well as the RIEable till layer. A magnetic shielding material 3304 can be deposited followed by another planarizing CMP, leaving a structure as shown in FIG. 33.

Figure 34:
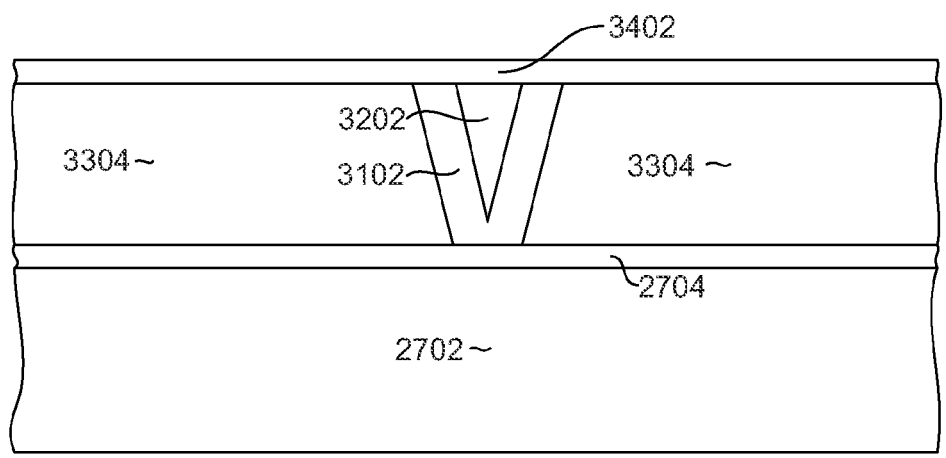

Then, after the write pole 3202 has been thus defined with a smooth planar surface as described above with reference to FIG. 33. A separated lithographic patterning process can be performed to form a spin torque oscillator. With reference to FIG. 34, a spin torque oscillator 3402 is deposited full film over the planarized surface. While it is to be understood that this layer 3402 actually includes various layers necessary to construct a spin torque oscillator, it is being described herein as a single layer 3402 for purposes of simplicity.

Figure 35:
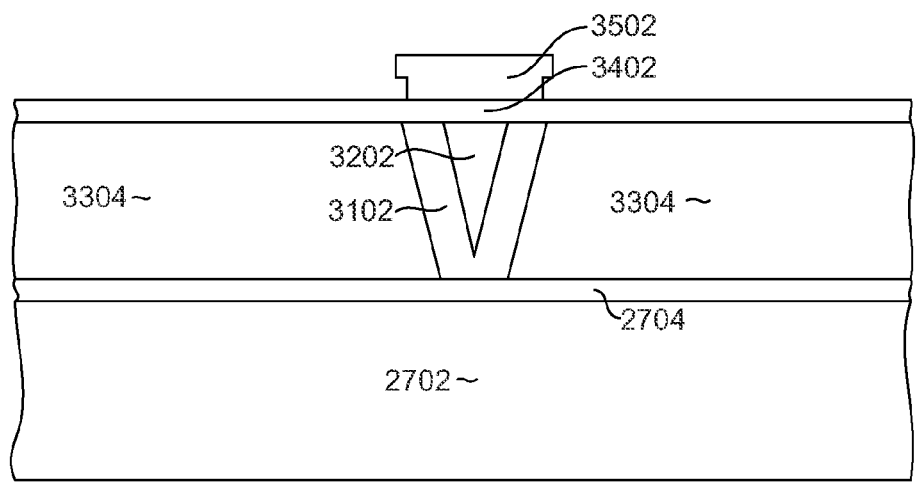
Figure 36:
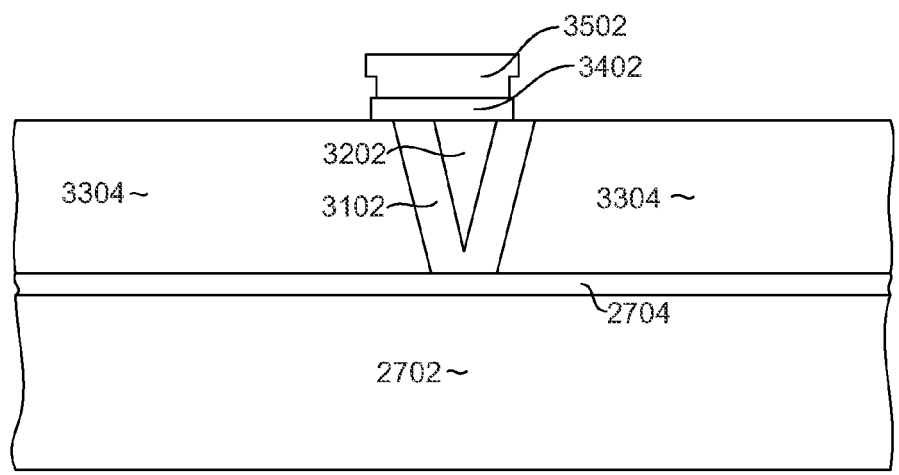
Figure 37:
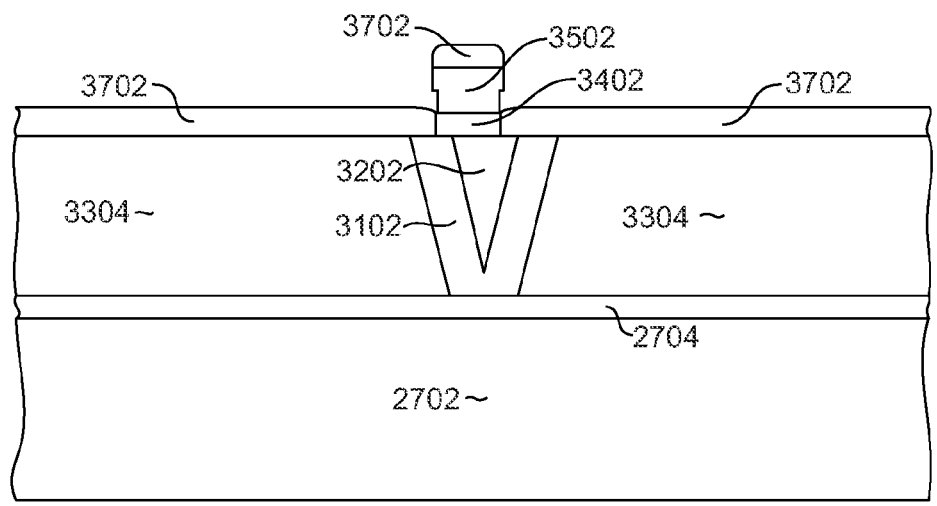
Figure 38:
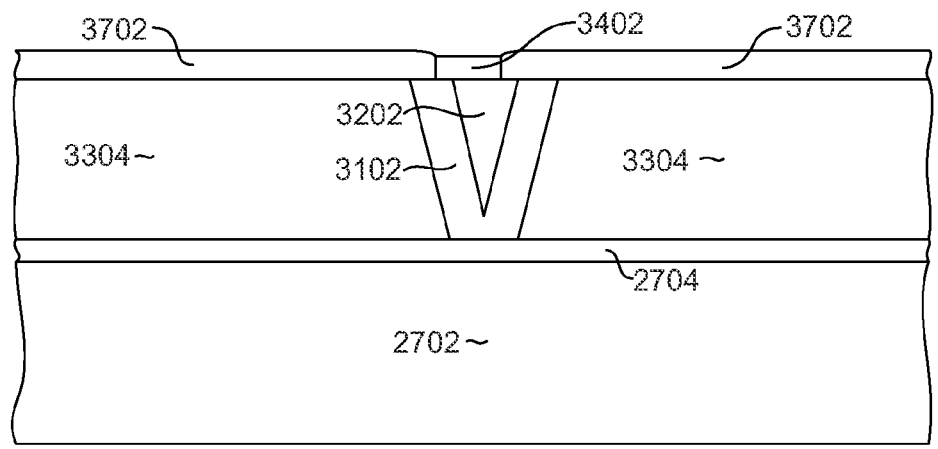
Figure 39:
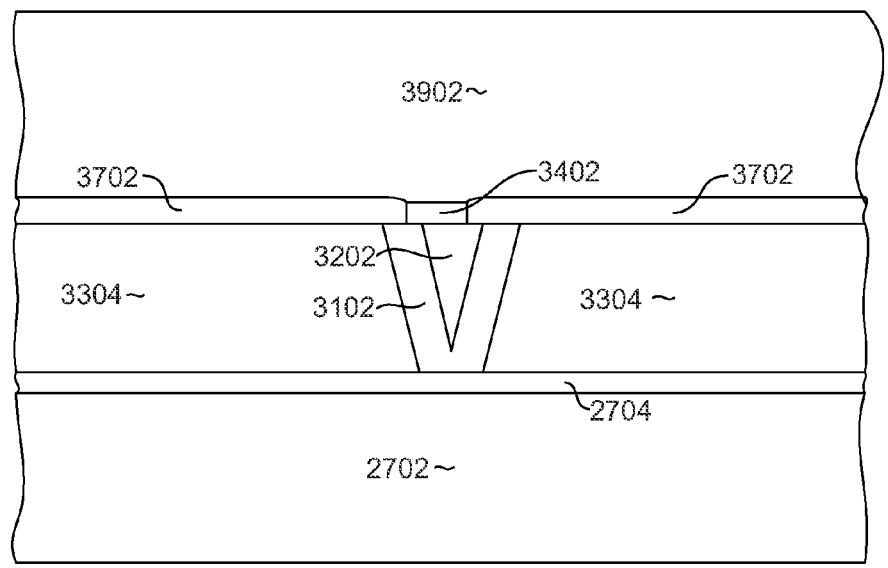

Then, with reference to FIG. 35 as spin torque oscillator defining mask 3502 is formed over the spin torque oscillator layer 3402. This mask 3502 can be formed by photolithographic patterning of a photoresist layer, and is preferably formed as a bi-layer photoresist mask having overhanging edges as shown. After the mask 3502 is formed, a reactive ion etching or ion milling can be performed to remove portions of the spin torque oscillator layer that are not protected by the mask 3502, thereby leaving a structure as shown in FIG. 36. Then, with reference to FIG. 37, with the mask 3502 still in place, a layer of non-magnetic, electrically insulating fill material such as alumina 3702 is deposited. The mask 3502 can then be lifted off, such as by a chemical liftoff process, leaving a structure as shown in FIG. 38. Finally, with reference to FIG. 39 a trailing magnetic shield 3902 can be formed over the spin torque oscillator 3402 and non-magnetic, electrically insulating fill layer 3702. The trailing shield 3902 can be formed by electroplating a magnetic material such as NiFe.

The above described prior art process suffers from the drawback of having to define the spin torque oscillator 3402 in a separate photolithographic patterning process than was used to define the write pole. Perfect alignment of separate photolithographic patterning processes is, as a practical matter, impossible. This inevitably results in a certain amount of misalignment, or offset between the spin torque oscillator 3402 and the write pole 3102. This can be seen in the FIGS. 36-39, where the spin torque oscillator 3402 is not perfectly aligned with the write pole 3202, but is actually skewed to the left somewhat. This results in decreased performance because the oscillating magnetic field is not located where desired, but instead is closer to an adjacent track.

Another problem associated with this prior art process regards electrically insulating the sides of the spin torque oscillator to avoid electrical shunting from the sides of the spin torque oscillator. Because the spin torque oscillator was deposited and formed on the planar surface of the write pole 3202, gap layer 3102 and fill layer 2706, there needs to be a separately added insulation layer at the sides of the spin torque oscillator. It will be recalled above with reference to FIG. 25, that a magnetic write head manufactured by the described self-aligned process results in the spin torque oscillator 1202 being recessed into the side gap layers 2302 so that the side gap layers 2302 provide electrical insulation for the sides of the spin torque oscillator 1202. This eliminates the need for a separately deposited side insulation layer, such as the layer 3702 of FIG. 39. Therefore, in the sensor of FIG. 39, manufactured by the prior art process, the trailing shield 3902 and side shield 3304 are separated from one another, whereas in the sensor of FIG. 25, the trailing shield 2502 is a continuous structure providing both trailing and side shielding functions.

While various embodiments have been described above, it should be understood that they have been presented by way of example only and not imitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head comprising:
   a magnetic write pole having a first and second sides and a trailing edge extending from the first side to the second side, the trailing edge having a tapered portion;
   a spin torque oscillator formed entirely on the tapered portion of the trailing edge of the write pole, and having first and second sides that are aligned with the first and second sides of the write pole;
   a non-magnetic side gap layer formed at the first and second sides of the write pole and first and second sides of the spin torque oscillator;
   a trailing, wrap-around magnetic shield that is separated from the first and second sides of the write pole and first and second sides of the spin torque oscillator by the first and second non-magnetic side gap layers; and
   a non-magnetic trailing gap layer separating the spin torque oscillator from a trailing portion of the trailing, wrap-around magnetic shield.

2. The magnetic write head as in claim 1, wherein the tapered portion of the trailing edge of the write pole defines an angle not greater than 25 degrees with respect to a plane that is parallel with an as deposited plane of layers of the write head.

3. The magnetic write head as in claim 1, wherein the tapered portion of the trailing edge of the write pole defines a plane that is not greater than 25 degrees with respect to a plane that is perpendicular to an air bearing surface of the write head.

4. The magnetic write head as in claim 1, wherein the tapered portion of the trailing edge of the write pole defines an angle that is 10-25 degrees with respect to a plane that is parallel with an as deposited plane of layers of the write head.

5. The magnetic write head as in claim 1, wherein the tapered portion of the trailing edge of the write pole defines a plane that is 10-25 degrees with respect to a plane that is perpendicular to an air bearing surface of the write head.

6. The magnetic write head as in claim 1, wherein the non-magnetic trailing gap layer comprises an electrically conductive material that serves as a trailing shield seed layer as well as a non-magnetic trailing gap layer.

7. The magnetic write head as in claim 1 wherein the non-magnetic trailing gap layer comprises Ru or Rh.

8. The magnetic write head as in claim 1 wherein the first side of the write pole defines a first plane, the second side of the write pole defines a second plane and wherein the first side of the spin torque oscillator is formed along the first plane and the second side of the spin torque oscillator is formed along the second plane.

* * * * *